(12) United States Patent
Hassanzadeh et al.

(10) Patent No.: US 11,831,675 B2
(45) Date of Patent: Nov. 28, 2023

(54) PROCESS RISK CALCULATION BASED ON HARDNESS OF ATTACK PATHS

(71) Applicant: Accenture Global Solutions Limited, Dublin (IE)

(72) Inventors: Amin Hassanzadeh, Arlington, VA (US); Anup Nayak, Potomac, MD (US); MD Sharif Ullah, Norfolk, VA (US)

(73) Assignee: Accenture Global Solutions Limited, Dublin (IE)

( * ) Notice: Subject to any disclaimer, the term of this patent is extended or adjusted under 35 U.S.C. 154(b) by 187 days.

(21) Appl. No.: 17/080,252

(22) Filed: Oct. 26, 2020

(65) Prior Publication Data

US 2022/0131894 A1 Apr. 28, 2022

(51) Int. Cl.
*H04L 9/40* (2022.01)

(52) U.S. Cl.
CPC ...... *H04L 63/1466* (2013.01); *H04L 63/1416* (2013.01); *H04L 63/1433* (2013.01); *H04L 63/18* (2013.01); *H04L 63/20* (2013.01)

(58) Field of Classification Search
CPC ............. H04L 63/1466; H04L 63/1416; H04L 63/1433; H04L 63/18; H04L 63/20; H04L 9/0827; H04L 9/3215; H04L 63/0227
(Continued)

(56) References Cited

U.S. PATENT DOCUMENTS

| 5,521,910 A | 5/1996 | Matthews |
| 6,279,113 B1 | 8/2001 | Vaidya |

(Continued)

FOREIGN PATENT DOCUMENTS

| EP | 1559008 | 8/2005 |
| EP | 1768043 | 3/2007 |

(Continued)

OTHER PUBLICATIONS

Kaloroumakis et al., "Toward a Knowledge Graph of Cybersecurity Countermeasures," Technical Report, The MITRE Corporation, 2021, 11 pages.

(Continued)

*Primary Examiner* — Jorge L Ortiz Criado
*Assistant Examiner* — Joshua N Gonzales
(74) *Attorney, Agent, or Firm* — Fish & Richardson P.C.

(57) ABSTRACT

Implementations are directed to receiving analytical attack graph (AAG) data representative of one or more AAGs, each AAG representing one or more lateral paths between configuration items within an enterprise network, calculating, for each configuration item in a set of configuration items, a process risk value for each impact in a set of impacts achievable within the configuration item, for a first impact, a first process risk value being calculated based on a multi-path formula in response to determining that multiple paths in the AAG lead to the first impact, and, for a second impact, a second process risk value being calculated based on a single-path formula in response to determining that a single path in the AAG leads to the second impact, and determining that at least one process risk value exceeds a threshold process risk value, and in response, adjusting one or more security controls within the enterprise network.

14 Claims, 6 Drawing Sheets

(58) Field of Classification Search
USPC .......................................................... 726/22
See application file for complete search history.

(56) References Cited

U.S. PATENT DOCUMENTS

| | | |
|---|---|---|
| 6,487,666 B1 | 11/2002 | Shanklin et al. |
| 7,540,025 B2 | 5/2009 | Tzadikario |
| 7,703,138 B2 | 4/2010 | Desai et al. |
| 7,904,962 B1 | 3/2011 | Jajodia et al. |
| 8,099,760 B2 | 1/2012 | Cohen et al. |
| 8,176,561 B1 | 5/2012 | Hurst et al. |
| 8,656,493 B2 | 2/2014 | Capalik |
| 8,881,288 B1 | 11/2014 | Levy et al. |
| 9,166,997 B1 | 10/2015 | Guo et al. |
| 9,256,739 B1 | 2/2016 | Roundy et al. |
| 9,563,771 B2 | 2/2017 | Lang et al. |
| 9,633,306 B2 | 4/2017 | Liu et al. |
| 9,992,219 B1 | 6/2018 | Hamlet et al. |
| 10,084,804 B2 | 9/2018 | Kapadia et al. |
| 10,291,645 B1 | 5/2019 | Frantzen et al. |
| 10,382,473 B1* | 8/2019 | Ashkenazy ......... H04L 63/1466 |
| 10,447,721 B2 | 10/2019 | Lasser |
| 10,447,727 B1 | 10/2019 | Hecht |
| 10,601,854 B2* | 3/2020 | Lokamathe ......... H04L 63/1433 |
| 10,642,840 B1 | 5/2020 | Attaluri et al. |
| 10,659,488 B1 | 5/2020 | Rajasooriya et al. |
| 10,771,492 B2 | 9/2020 | Hudis et al. |
| 10,848,515 B1 | 11/2020 | Pokhrel et al. |
| 10,868,825 B1 | 12/2020 | Dominessy et al. |
| 10,873,533 B1 | 12/2020 | Ismailsheriff et al. |
| 10,956,566 B2 | 3/2021 | Shu et al. |
| 10,958,667 B1 | 3/2021 | Maida et al. |
| 11,038,900 B2 | 6/2021 | Jusko et al. |
| 11,089,040 B2 | 8/2021 | Jang et al. |
| 11,128,654 B1 | 9/2021 | Joyce et al. |
| 11,159,555 B2 | 10/2021 | Hadar et al. |
| 11,184,385 B2 | 11/2021 | Hadar et al. |
| 11,232,235 B2 | 1/2022 | Hadar et al. |
| 11,277,431 B2 | 3/2022 | Hassanzadeh et al. |
| 11,281,806 B2 | 3/2022 | Hadar et al. |
| 11,283,824 B1* | 3/2022 | Berger ................ H04L 63/1416 |
| 11,283,825 B2 | 3/2022 | Grabois et al. |
| 11,411,976 B2 | 8/2022 | Basovskiy et al. |
| 11,483,213 B2 | 10/2022 | Engelberg et al. |
| 11,533,332 B2 | 12/2022 | Engelberg et al. |
| 2005/0138413 A1 | 6/2005 | Lippmann et al. |
| 2005/0193430 A1 | 9/2005 | Cohen et al. |
| 2006/0037077 A1 | 2/2006 | Gadde et al. |
| 2008/0044018 A1 | 2/2008 | Scrimsher et al. |
| 2008/0289039 A1 | 11/2008 | Rits et al. |
| 2008/0301765 A1 | 12/2008 | Nicol et al. |
| 2009/0077666 A1 | 3/2009 | Chen et al. |
| 2009/0138590 A1 | 5/2009 | Lee et al. |
| 2009/0307772 A1 | 12/2009 | Markham et al. |
| 2009/0319248 A1 | 12/2009 | White et al. |
| 2010/0058456 A1 | 3/2010 | Jajodia et al. |
| 2010/0138925 A1 | 7/2010 | Barai et al. |
| 2010/0174670 A1 | 7/2010 | Malik et al. |
| 2011/0035803 A1 | 2/2011 | Lucangeli Obes et al. |
| 2011/0061104 A1 | 3/2011 | Sarraute Yamada et al. |
| 2011/0093916 A1 | 4/2011 | Lang et al. |
| 2011/0093956 A1 | 4/2011 | Laarakkers et al. |
| 2013/0097125 A1 | 4/2013 | Marvasti et al. |
| 2013/0219503 A1 | 8/2013 | Amnon et al. |
| 2014/0082738 A1 | 3/2014 | Bahl |
| 2014/0173740 A1 | 6/2014 | Albanese et al. |
| 2015/0047026 A1 | 2/2015 | Neil et al. |
| 2015/0106867 A1 | 4/2015 | Liang |
| 2015/0199207 A1 | 7/2015 | Lin et al. |
| 2015/0261958 A1 | 9/2015 | Hale et al. |
| 2015/0326601 A1 | 11/2015 | Grondin et al. |
| 2015/0350018 A1 | 12/2015 | Hui et al. |
| 2016/0105454 A1 | 4/2016 | Li et al. |
| 2016/0205122 A1 | 7/2016 | Bassett |
| 2016/0277423 A1 | 9/2016 | Apostolescu et al. |
| 2016/0292599 A1 | 10/2016 | Andrews et al. |
| 2016/0301704 A1 | 10/2016 | Hassanzadeh et al. |
| 2016/0301709 A1 | 10/2016 | Hassanzadeh et al. |
| 2017/0012836 A1 | 1/2017 | Tongaonkar et al. |
| 2017/0032130 A1 | 2/2017 | Joseph et al. |
| 2017/0041334 A1 | 2/2017 | Kahn et al. |
| 2017/0078322 A1 | 3/2017 | Seiver et al. |
| 2017/0085595 A1 | 3/2017 | Ng et al. |
| 2017/0163506 A1 | 6/2017 | Keller |
| 2017/0230410 A1 | 8/2017 | Hassanzadeh et al. |
| 2017/0318050 A1 | 11/2017 | Hassanzadeh et al. |
| 2017/0324768 A1 | 11/2017 | Crabtree et al. |
| 2017/0364702 A1 | 12/2017 | Goldfarb et al. |
| 2017/0366416 A1 | 12/2017 | Beecham et al. |
| 2018/0013771 A1 | 1/2018 | Crabtree et al. |
| 2018/0103052 A1 | 4/2018 | Choudhury et al. |
| 2018/0152468 A1 | 5/2018 | Nor et al. |
| 2018/0159890 A1 | 6/2018 | Warnick et al. |
| 2018/0183827 A1 | 6/2018 | Zorlular et al. |
| 2018/0255077 A1 | 9/2018 | Paine |
| 2018/0255080 A1 | 9/2018 | Paine |
| 2018/0295154 A1 | 10/2018 | Crabtree et al. |
| 2018/0367548 A1 | 12/2018 | Stokes, III et al. |
| 2019/0052663 A1 | 2/2019 | Lee et al. |
| 2019/0052664 A1 | 2/2019 | Kibler et al. |
| 2019/0132344 A1 | 5/2019 | Lem et al. |
| 2019/0141058 A1 | 5/2019 | Hassanzadeh et al. |
| 2019/0182119 A1 | 6/2019 | Ratkovic et al. |
| 2019/0188389 A1 | 6/2019 | Peled et al. |
| 2019/0230129 A1 | 7/2019 | Digiambattista et al. |
| 2019/0312898 A1 | 10/2019 | Verma et al. |
| 2019/0319987 A1* | 10/2019 | Levy .................... H04L 63/083 |
| 2019/0362279 A1 | 11/2019 | Douglas |
| 2019/0370231 A1 | 12/2019 | Riggs et al. |
| 2019/0373005 A1 | 12/2019 | Bassett |
| 2020/0014265 A1 | 1/2020 | Whebe Spiridon |
| 2020/0014718 A1 | 1/2020 | Joseph Durairaj et al. |
| 2020/0042328 A1 | 2/2020 | Gupta |
| 2020/0042712 A1 | 2/2020 | Foo et al. |
| 2020/0045069 A1 | 2/2020 | Nanda et al. |
| 2020/0099704 A1 | 3/2020 | Lee et al. |
| 2020/0112487 A1 | 4/2020 | Inamdar et al. |
| 2020/0128047 A1 | 4/2020 | Biswas et al. |
| 2020/0137104 A1 | 4/2020 | Hassanzadeh et al. |
| 2020/0175175 A1 | 6/2020 | Hadar et al. |
| 2020/0177615 A1 | 6/2020 | Grabois et al. |
| 2020/0177616 A1 | 6/2020 | Hadar et al. |
| 2020/0177617 A1 | 6/2020 | Hadar et al. |
| 2020/0177618 A1 | 6/2020 | Hassanzadeh et al. |
| 2020/0177619 A1 | 6/2020 | Hadar et al. |
| 2020/0272972 A1 | 8/2020 | Harry et al. |
| 2020/0296137 A1 | 9/2020 | Crabtree et al. |
| 2020/0311630 A1* | 10/2020 | Risoldi ................ G06F 3/0482 |
| 2020/0351295 A1* | 11/2020 | Nhlabatsi ............ H04L 63/205 |
| 2020/0358804 A1 | 11/2020 | Crabtree et al. |
| 2021/0006582 A1 | 1/2021 | Yamada et al. |
| 2021/0099490 A1 | 4/2021 | Crabtree et al. |
| 2021/0105294 A1* | 4/2021 | Kruse .................. H04L 63/145 |
| 2021/0168175 A1 | 6/2021 | Crabtree et al. |
| 2021/0173711 A1 | 6/2021 | Crabtree et al. |
| 2021/0218770 A1 | 7/2021 | Ben-Yosef et al. |
| 2021/0248443 A1 | 8/2021 | Shu et al. |
| 2021/0273978 A1 | 9/2021 | Hadar et al. |
| 2021/0288995 A1* | 9/2021 | Attar .................. H04L 41/0879 |
| 2021/0336981 A1* | 10/2021 | Akella ................ G06N 3/0454 |
| 2021/0409426 A1 | 12/2021 | Engelberg et al. |
| 2021/0409439 A1 | 12/2021 | Engelberg et al. |
| 2022/0014445 A1 | 1/2022 | Engelberg et al. |
| 2022/0014534 A1 | 1/2022 | Basovskiy et al. |
| 2022/0021698 A1 | 1/2022 | Hadar et al. |
| 2022/0038491 A1 | 2/2022 | Hadar et al. |
| 2022/0051111 A1 | 2/2022 | Hadar et al. |
| 2022/0070202 A1 | 3/2022 | Busany et al. |
| 2022/0124115 A1 | 4/2022 | Grabois et al. |
| 2022/0129590 A1 | 4/2022 | Hadar et al. |
| 2022/0150270 A1 | 5/2022 | Klein et al. |
| 2022/0182406 A1 | 6/2022 | Inokuchi |
| 2022/0188460 A1 | 6/2022 | Hadar et al. |
| 2022/0263855 A1 | 8/2022 | Engelberg et al. |

(56) References Cited

U.S. PATENT DOCUMENTS

| | | | |
|---|---|---|---|
| 2022/0337617 | A1 | 10/2022 | Basovskiy et al. |
| 2023/0021961 | A1 | 1/2023 | Engelberg et al. |
| 2023/0034910 | A1 | 2/2023 | Engelberg et al. |
| 2023/0067128 | A1 | 3/2023 | Engelberg et al. |
| 2023/0067777 | A1 | 3/2023 | Hadar et al. |
| 2023/0076372 | A1 | 3/2023 | Engelberg et al. |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.

MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.

MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.

Wikipedia.org [online], "Reachability," last updated Oct. 22, 2021, retrieved on Jul. 13, 2022, retrieved from URL<https://en.wikipedia.org/wiki/Reachability>, 5 pages.

Almeida et al., "An ontological analysis of the notion of community in the RM-ODP enterprise language," Computer Standards & Interfaces, Mar. 2013, 35(3):257-268.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing," RFID Journal, Jun. 22, 2009, 1 page.

Borgo et al., "Ontological Foundations of DOLCE," Theory and Applications of Ontology: Computer Applications, Aug. 5, 2010, 279-295.

Burger et al., "Scaling to the end of silicon with edge architectures," Computer, Jul. 2004, 37(7):44-55.

Cravero, "Big data architectures and the internet of things: A systematic mapping study," IEEE Latin America Transactions, Apr. 2018, 16(4):1219-1226.

Daniele et al., "An ontological approach to logistics," Enterprise Interoperability: Research and Applications in the Service-oriented Ecosystem, Oct. 11, 2013, 199-213.

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

Duarte et al., "Towards an Ontology of Requirements at Runtime," Formal Ontology in Information Systems, Jan. 2016, 283:255-268.

El Saddik, "Digital Twins: The Convergence of Multimedia Technologies," IEEE MultiMedia, Apr.-Jun. 2018, 25(2):87-92.

Gailly et al., "Ontological Reengineering of the REA-EO using UFO," Presented at Proceedings of the International Workshop on Ontology-Driven Software Engineering, Orlando, FL, USA, Oct. 2009, 15 pages.

Gandomi et al., "Beyond the hype: Big data concepts, methods, and analytics," International Journal of Information Management, Apr. 2015, 35(2):137-144.

Genovese, "Data mesh: the newest paradigm shift for a distributed architecture in the data world and its application," Thesis for the degree of Computer Engineering, Politecnico di Torino, 2021, 76 pages.

Giunchiglia et al., "Lightweight Ontologies," Technical Report DIT-07-071, University of Trento, Oct. 2007, 10 pages.

Gomez-Perez et al., "Ontology languages for the Semantic Web," IEEE Intelligent Systems, Feb. 2002, 17(1):54-60.

Guarino, "Formal Ontology in Information Systems," Presented at Proceedings of the 1st International Conference, Trento, Italy, Jun. 6-8, 1998, 3-15.

Guizzardi et al., "An Ontology-Based Approach for Evaluating the Domain Appropriateness and Comprehensibility Appropriateness of Modeling Languages," MoDELS, 2005, 691-705.

Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.

Guizzardi, "Ontological Foundations for Structural Conceptual Models," Thesis for the degree of Doctor, University of Twente, 2005, 441 pages.

Guizzardi, "Ontology, Ontologies and the "I" of FAIR," Data Intelligence, Jan. 1, 2020, 2(1-2):181-191.

Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.

Hassani et al., "Artificial Intelligence (AI) or Intelligence Augmentation (IA): What Is the Future?," AI, Apr. 12, 2020, 1(2):143-155.

Herre, "General Formal Ontology (GFO): A Foundational Ontology for Conceptual Modelling," Theory and Applications of Ontology: Computer Applications, Aug. 12, 2010, 297-345.

Jacobsen et al., "FAIR Principles: Interpretations and Implementation Considerations," Data Intelligence, Jan. 1, 2020, 2(1-2):10-29.

Machado et al., "Data Mesh: Concepts and Principles of a Paradigm Shift in Data Architectures," Procedia Computer Science, 2022, 196:263-271.

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

Mathis, "Data lakes," Datenbank-Spektrum, Oct. 6, 2017, 17(3):289-293.

Monino, "Data Value, Big Data Analytics, and Decision-Making," Journal of the Knowledge Economy, Aug. 20, 2016, 256-267.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

Sitton-Candanedo et al., "A review of edge computing reference architectures and a new global edge proposal," Future Generation Computer Systems, Oct. 2019, 99:278-294.

Tan et al., "Future internet: The Internet of Things," Presented at Proceedings of the 2010 3rd International Conference on Advanced Computer Theory and Engineering (ICACTE), Chengdu, China, Aug. 20-22, 2010.

Uschold et al., "Ontologies: Principles, methods and applications," The Knowledge Engineering Review, Jan. 1996, 11(2):93-136.

Van Heijst et al., "Using explicit ontologies in KBS development," International Journal of Human-Computer Studies, Feb. 1997, 46(2-3):183-292.

(56) References Cited

OTHER PUBLICATIONS

Wand et al., "On the deep structure of information systems," Information Systems Journal, Jul. 1995, 5(3):203-223.

Wang et al., "Big data analytics in cyber security: network traffic and attacks," Journal of Computer Information Systems, Jan. 2020, 61(3):1-8.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

Abraham et al. "A Predictive Framework for Cyber Security Analytics Using Attack Graphs." International Journal of Computer Networks & Communications (IJCNC). vol. 7, No. 1, Jan. 2015. (Year: 2015).

CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.

Grigorescu et al., "CVE2ATT&CK: BERT-Based Mapping of CVEs to MITRE ATT&CK Techniques," Algorithms, Aug. 31, 2022, 15(9):314, 22 pages.

Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.

Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.

Chen Zhong, Towards Agile Cyber Analysis: Leveraging Visualization as Functions in Collaborative Visual Analytics, IEEE:2017, pp. 1-2.

EP Extended Search Report in European Appln. No. 22187514.9, dated Nov. 29, 2022, 7 pages.

EP Extended Search Report in European Appln. No. 22193272.6, dated Jan. 25, 2023, 8 pages.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

X. Li, C. Zhang, T. Jung, J. Qian and L. Chen, "Graph-based privacy-preserving data publication," IEEE INFOCOM 2016—The 35th Annual IEEE International Conference on Computer Communications, 2016, pp. 1-9, doi: 10.1109/IN F000M.2016.7524584. (Year: 2016).

Abraham et al., "Cyber Security Analytics: A Stochastic Model for Security Quantification Using Absorbing Markov Chains," Journal of Communications, Dec. 2014, 9(12):899-907.

Atoum et al., "A holistic cyber security implementation framework," Information Management & Computer Security, Jul. 2014, 22(3):251-264.

Fielder et al., "Decision support approaches for cyber security investment," Decision Support Systems, Jun. 2016, 86:13-23.

Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.

Grieves, "Virtually Intelligent Product Systems: Digital and Physical Twins", Complex Systems Engineering: Theory and Practice, Jul. 2019, 256:175-200.

Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.

Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.

Husák et al., "Survey of Attack Projection, Prediction, and Forecasting in Cyber Security," IEEE Communications Surveys & Tutorials, Sep. 24, 2018, 21(1):640-660.

International Organization for Standardization, "International Standard: ISO/IEC 27001," ISO/IEC 27001:2013(E), Oct. 1, 2013, 29 pages.

Joint Task Force Transformation Initiative, "Security and Privacy Controls for Federal Information Systems and Organizations," National Institute of Standards and Technology Special Publication 800-53, Revision 4, Jan. 22, 2015, 462 pages.

Khouzani et al., "Scalable min-max multi-objective cyber-security optimization over probabilistic attack graphs", European Journal of Operational Research, Nov. 1, 2019, 278(3):894-903.

Schatz et al., "Economic valuation for information security investment: a systematic literature review," Information Systems Frontiers, Apr. 18, 2016, 19:1205-1228.

Shandilya et al., "Use of Attack Graphs in Security Systems", Hindawi Journal of Computer Networks and Communications, Oct. 20, 2014, 2014:818957, 14 pages.

Strom et al., "MITRE ATT&CK™: Design and Philosophy", The MITRE Corporation, Jul. 2018, 37 pages.

Wikipedia.org [online], "Centrality," last updated Oct. 18, 2020, retrieved on Oct. 26, 2020, retrieved from URL<https://en.wikipedia.org/wiki/Centrality>, 15 pages.

Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.

Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.

Wikipedia.org [online], "Traffic flow," last updated Oct. 19, 2020, retrieved on Oct. 26, 2020, retrieved from URL<https://en.wikipedia.org/wiki/Traffic_flow>, 41 pages.

Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

You et al., "A Review of Cyber Security Controls from An ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

(56) References Cited

OTHER PUBLICATIONS

Zhang et al., "Optimal Decision-Making Approach for Cyber Security Defense Using Game Theory and Intelligent Learning," Security and Communication Networks, Dec. 23, 2019, 2019:3038586, 17 pages.
Borgatti et al., "A Graph-theoretic perspective on centrality," Social Networks, Oct. 2006, 28(4):466-484.
EP Search Report in European Application. No. EP20185251, dated Oct. 21, 2020, 7 pages.
Wang et al., "A Network Vulnerability Assessment Method Based on Attack Graph," 2018 IEEE 4th International Conference on Computer and Communications, Dec. 7-10, 2018, Chengdu, China, 1149-1154.
Brazhuk, "Towards automation of threat modeling based on a semantic model of attack patterns and weaknesses," arXiv, Dec. 8, 2021, arXiv:2112.04231v1, 14 pages.
EP Extended Search Report in European Appln. No. 22157487.4, dated Jun. 9, 2022, 10 pages.
Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Horrocks et al., "SWRL: A Semantic Web Rule Language Combining OWL and RuleML," W3C Member Submission, May 21, 2004, 24 pages.
Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.
Rossi et al., "Knowledge Graph Embedding for Link Prediction: A Comparative Analysis," arXiv, Feb. 3, 2020, arXiv:2002.00819v1, 42 pages.
Wikipedia.org [online], "Natural language processing," last updated Jun. 10, 2022, retrieved on Jun. 14, 2022, retrieved from URL<https://en.wikipedia.org/wiki/Natural_language_processing>, 13 pages.
Narmeen Zakaria Bawany; DDoS Attack Detection and Mitigation Using SON: Methods, Practices, and Solutions; SPRINGER-2017; p. 425-441.
EP Extended Search Report in European Appln. No. 21191752.1, dated Jan. 4, 2022, 8 pages.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia. org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Sigmoid function," last updated Dec. 25, 2020, retrieved on Jan. 11, 2021, retrieved from URL<https://en.wikipedia.org/wiki/Sigmoid_ function>, 4 pages.
Barik et al., "Attack Graph Generation and Analysis Techniques, " Defence Science Journal, Nov. 2016, 66(6):559-567.
Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.
Bonacich, "Power and Centrality: A Family of Measures," American Journal of Sociology, Mar. 1987, 92(5):1170-1182.
Cohen-Addad et al., "Hierarchical Clustering: Objective Functions and Algorithms," Journal of the ACM, Jun. 2019, 66(4):26, 42 pages.
EP Search Report in European Application No. EP 19212981, dated Mar. 4, 2020, 6 pages.
EP Search Report in European Application No. EP19212974, dated Feb. 14, 2020, 8 pages.
EP Search Report in European Application No. EP19212976, dated Feb. 14, 2020, 8 pages.
Fundamentals of Business Process Management, 2nd ed., Dumas et al. (eds.), 2018, 546 pages.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
National Institute of Standards and Technology [online], "National Vulnerability Database," last updated Jun. 2, 2020, retrieved on Jun. 3, 2020, retrieved from URL<https://nvd.nist.gov/>, 4 pages.
Networks: An Introduction, Newman (ed.), May 2010, 789 pages.
Ou et al., "A Scalable Approach to Attack Graph Generation," Proceedings of the 13th ACM Conference on Computer and Communication Security, Oct. 2006, 336-345.
Ou et al., "MulVAL: A Logic-based Network Security Analyzer," 14th USENIX Security Symposium, Aug. 2005, Baltimore, MD, USA, 16 pages.
Process Mining, 1st ed., van der Aalst, 2011, Chapters 5-6, 63 pages.
Purvine et al., "A Graph-Based Impact Metric for Mitigating Latheral Movement Cyber Attacks", Automated Descision Making for Active Cyber Defence, Oct. 2016, pp. 45-52.
Sourceforge.net [online], "XSB," last updated Oct. 29, 2017, retrieved on Jun. 3, 2020, retrieved from URL <http://xsb.sourceforge.net/>, 2 pages.
The MITRE Corporation [online], "MITRE ATT&CK," last updated May 27, 2020, retrieved on Jun. 3, 2020, retrieved from URL <https://attack.mitre.org/>, 3 pages.
Ullah et al., "Towards Modeling Attacker's Opportunity for Improving Cyber Resilience in Energy Delivery Systems", Resilience Week, Aug. 2018, pp. 100-107.
Wang et al., "Exploring Attack Graph for Cost-benefit Security Hardening: A Probabilistic Approach," Computers & Security, Feb. 2013, 32:158-169.
Wikipedia.org [online], "Active Directory," last updated Jun. 1, 2020, retrieved on Jun. 3, 2020, retrieved from URL <https://en.wikipedia.org/wiki/Active_Directory>, 14 pages.
Wikipedia.org [online], "Backward Chaining," last updated Nov. 16, 2019, retrieved on Jun. 3, 2020, retrieved from URL <https://en.wikipedia.org/wiki/Backward_chaining>, 3 pages.
Wikipedia.org [online], "Cartesian Product," last updated Feb. 28, 2020, retrieved on Jun. 3, 2020, retrieved from URL <https://en.wikipedia.org/wiki/Cartesian_product>, 9 pages.
Wikipedia.org [online], "Centrality," last updated May 29, 2020, retrieved on Jun. 3, 2020, retrieved from URL <https://en.wikipedia.org/wiki/Centrality>, 15 pages.
Wikipedia.org [online], "Flood Fill," last updated Dec. 24, 2019, retrieved on Jun. 3, 2020, retrieved from URL <https://en.wikipedia.org/wiki/Flood_fill>, 7 pages.
Wikipedia.org [online], "Forward Chaining," last updated Nov. 18, 2019, retrieved on Jun. 3, 2020, retrieved from URL <https://en.wikipedia.org/wiki/Forward_chaining>, 3 pages.
Wikipedia.org [online], "Look-ahead (backtracking)," last updated May 23, 3030, retrieved on Jun. 3, 2020, retrieved from URL <https://en.wikipedia.org/wiki/Look-ahead_(backtracking)>, 3 pages.
Wikipedia.org [online], "SCADA," last updated Jun. 2, 2020, retrieved on Jun. 3, 2020, retrieved from URL <https://en.wikipedia.org/wiki/SCADA>, 12 pages.
Alvarenga et al., "Discovering Attack Strategies Using Process Mining," Presented at Proceedings of The Eleventh Advanced International Conference on Telecommunications, Brussels, Belgium, Jun. 21-26, 2015, 119-125.
Chen et al., "Distributed Attack Modeling Approach Based on Process Mining and Graph Segmentation," Entropy, Sep. 2020, 22(9):1026, 21 pages.
Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.

(56) References Cited

OTHER PUBLICATIONS

IEEE, "IEEE Standard for eXtensible Event Stream (XES) for Achieving Interoperability in Event Logs and Event Stream," IEEE Std 1849™-2016, Sep. 22, 2016, 50 pages.
Murata, "Petri Nets: Properties, Analysis and Applications," Proceedings of the IEEE, Apr. 1989, 77(4):541-580.
Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.
Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/>, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.
PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.
PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.
Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.
Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.
Wikipedia.org [online], "Depth-first search," last updated Jun. 16, 2021, retrieved on Jul. 28, 2021, retrieved from URL<https://en.wikipedia.org/wiki/Depth-first_search>, 8 pages.
3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.
Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.
Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.
EP Search Report in European Application. No. 21159421.3, dated Jun. 30, 2021, 11 pages.
Foundations of Databases, 1st ed., Abiteboul et al. (eds.), 1995, Chapter 12, 38 pages.
GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.
Hansen et al., "Model-in-the-Loop and Software-in-the-Loop Testing of Closed-Loop Automotive Software with Arttest," Informatik, 2017, 13 pages.
Hofner et al., "Dijkstra, Floyd and Warshall meet Kleene," Formal Aspects of Computing, Jul. 2012, 24(4-6):459-476.
Idika et al., "Extending attack graph-based security metrics and aggregating their application," IEEE Transactions on Dependable and Secure Computing, Jan./Feb. 2012, 9(1):75-85.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Inglos et al., "Practical Attack Graph Generation for Network Defense," 2006 22nd Annual Computer Security Applications Conference (ACSAC'06), Miami Beach, Florida, Dec. 11-15, 2006, 10 pages.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
Noel et al., "CyGraph: Graph-Based Analytics and Visualization for Cybersecurity," Handbook of Statistics, Jan. 2016, 35:117-167.
Ortalo et al., "Experimenting with quantitative evaluation tools for monitoring operational security," IEEE Transactions on Software Engineering, Sep./Oct. 1999, 25(5):633-650.
Phillips et al., "A graph-based system for network-vulnerability analysis," Proceedings of the 1998 Workshop on New Security Paradigms, Charlottesville, Virginia, Sep. 22-26, 1998, 71-79.
Shi et al., "Normalized Cuts and Image Segmentation," IEEE Transactions on Pattern Analysis and Machine Intelligence, Aug. 2000, 22(8):888-905.
Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.
SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.
Stanek et al., "Method of comparing graph differencing algorithms for software differencing," 2008 IEEE International Conference on Electro/Information Technology, Ames, Iowa, May 18-20, 2008, 482-487.
Swiler et al., "A graph-based network-vulnerability analysis system," Sandia National Laboratories, 1997, Tech. Rep. SAND97-3010/1, 25 pages.
TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.
The Fourth Industrial Revolution, 1st. ed., Schwab, Jan. 2017, 218 pages.
Vehicle Power Management, 1st ed., Zhang et al (eds.), Aug. 2011, Chapter 10, 27 pages.

(56) References Cited

OTHER PUBLICATIONS

Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.

Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.

Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.

Wikipedia.org [online], "Digital twin," last updated Jul. 8, 2021, retrieved on Jul. 9, 2021, retrieved from URL<https://en.wikipedia.org/wiki/Digital_twin>, 13 pages.

Yi et al., "Overview on attack graph generation and visualization technology," 2013 International Conference on Anti-Counterfeiting, Security and Identification (ASID), Shanghai, China, Oct. 25-27, 2013, 6 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

Zhao et al., "Attack graph analysis method for large scale network security hardening," J. Front. Comput. Sci. Technology, 2018, 12(2):263-273 (with English Abstract).

\* cited by examiner

PROCESS RISK CALCULATION BASED ON HARDNESS OF ATTACK PATHS

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

Modern computer networks are largely segregated and often deployed with diverse cyber defense mechanisms, which makes it challenging for an attacker (hacker) to gain direct access to a target (e.g., administrator credentials). This pattern is commonly seen in industrial control systems (ICSs) where a layered architecture ensures that targets are not in close proximity to the perimeter. Despite the presence of a layered architecture, the spate of attacks is increasing rapidly and span from large enterprises to critical infrastructure (CINF) networks. Due to the potential severe damage and cost experienced by a victim, CINFs have been intentionally targeted and have suffered from significant losses when successfully exploited.

In an effort to defend against cyber-attacks, so-called analytical attack graphs (AAGs) can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network, and can be used to evaluate fixes of vulnerabilities that the AAG reveals (e.g., by fixing a limited number of issues, any adversary attack on the computer network, or on certain components in the computer network can be stopped).

SUMMARY

Implementations of the present disclosure are directed to leveraging analytical attack graphs (AAGs) for enterprise-wide cyber-security. More particularly, implementations of the present disclosure are directed to leveraging an AAG for process risk determination based on hardness of attack paths represented in an AAG. In some implementations, actions include receiving AAG data representative of one or more AAGs, each AAG representing one or more lateral paths between configuration items within an enterprise network, calculating, for each configuration item in a set of configuration items, a process risk value for each impact in a set of impacts achievable within the configuration item, for a first impact, a first process risk value being calculated based on a multi-path formula in response to determining that multiple paths in the AAG lead to the first impact, and, for a second impact, a second process risk value being calculated based on a single-path formula in response to determining that a single path in the AAG leads to the second impact, and determining that at least one process risk value exceeds a threshold process risk value, and in response, adjusting one or more security controls within the enterprise network.

Implementations of the present disclosure also include corresponding systems, apparatus, and computer programs, configured to perform the actions of the methods, encoded on computer storage devices.

These and other implementations can each optionally include one or more of the following features: the multi-path formula is $$H_{path,I_i} = -\alpha \ln\left(1 - \left(1 - e^{-\frac{H_{P_1}}{\alpha}}\right)\left(1 - e^{-\frac{H_{P_2}}{\alpha}}\right)\ldots\right)$$

where $H_{path,I_i}$ is a path hardness value representing a difficulty to reach impact $I_i$, and $H_{P_1}$ and $H_{P_2}$ are hardness values for respective paths (P1, P2) leading to impact $I_i$; the single-path formula is $$H_{path,I_i} = \Sigma(H_{I_{i-1}}, \ldots)$$

where $H_{path,I_i}$ is a path hardness value representing a difficulty to reach impact $I_i$, $H_{I_{i-1}}$ is a hardness value to achieve impact $I_{i-1}$ preceding $I_i$ in the AAG; adjusting one or more security controls within the enterprise network includes implementing at least one security control; adjusting one or more security controls within the enterprise network includes one or more of rolling back at least one security control of the one or more security controls and implementing at least one additional security control; the one or more security controls are determined to be ineffective in response to the process risk value one of remaining static and increasing after implementing the one or more security controls; and the one or more security controls include one or more security controls provided in ISO/IEC 27001.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
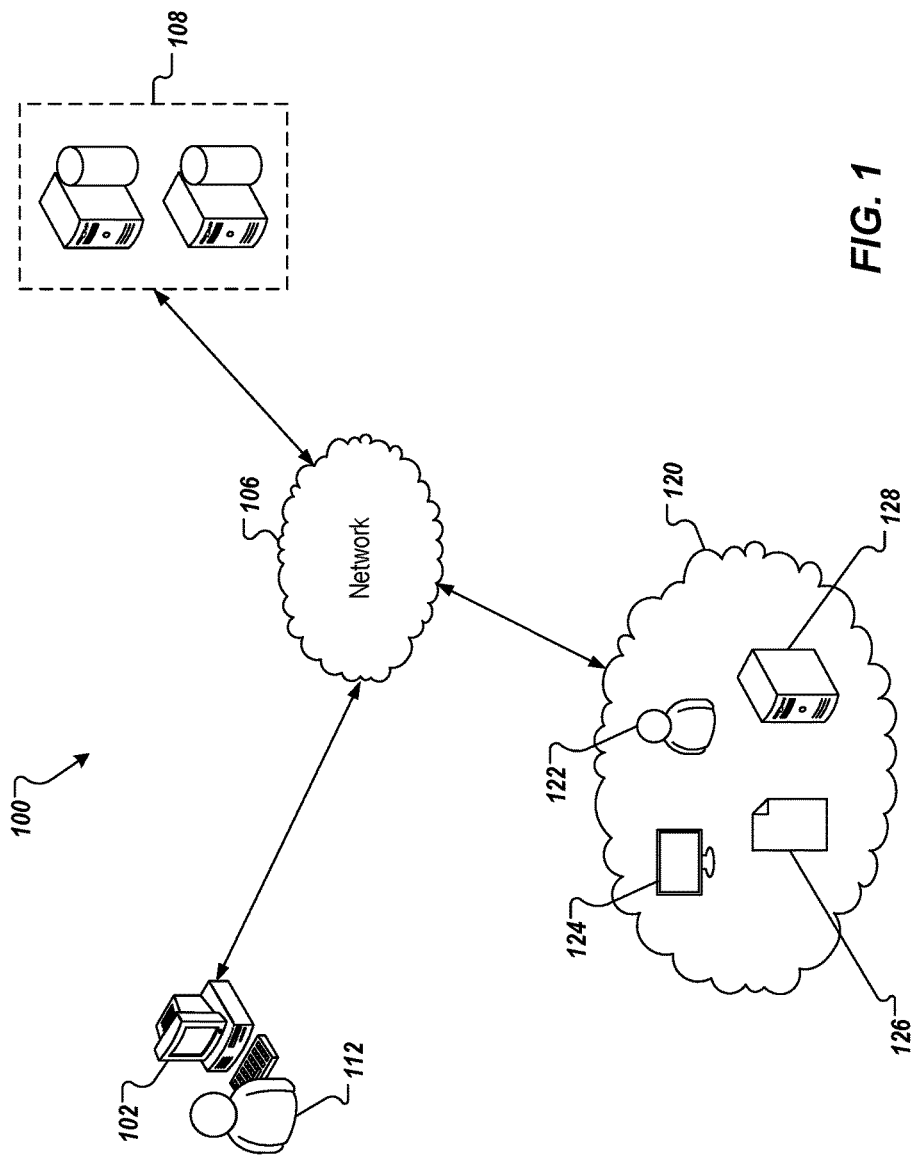
FIG. 1 depicts an example architecture that can be used to execute implementations of the present disclosure.

Implementations of the present disclosure are directed to leveraging analytical attack graphs (AAGs) for enterprise-wide cyber-security. More particularly, implementations of the present disclosure are directed to leveraging an AAG for process risk determination based on hardness of attack paths represented in an AAG. In some implementations, actions include receiving AAG data representative of one or more AAGs, each AAG representing one or more lateral paths between configuration items within an enterprise network, calculating, for each configuration item in a set of configuration items, a process risk value for each impact in a set of impacts achievable within the configuration item, for a first impact, a first process risk value being calculated based on a multi-path formula in response to determining that multiple paths in the AAG lead to the first impact, and, for a second impact, a second process risk value being calculated based on a single-path formula in response to determining that a single path in the AAG leads to the second impact, and determining that at least one process risk value exceeds a threshold process risk value, and in response, adjusting one or more security controls within the enterprise network.

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems. It is contemplated, however, that implementations of the present disclosure can be realized in any appropriate cyber-security platform.

To provide context for implementations of the present disclosure, and as introduced above, modern computer networks are largely segregated and often deployed with diverse cyber defense mechanisms, which makes it challenging for an attacker (hacker) to gain direct access to a target (e.g., administrator credentials). This pattern is commonly seen in industrial control system (ICSs) where a layered architecture ensures that targets are not in close proximity to the perimeter. Despite the presence of a layered architecture, the spate of attacks is increasing rapidly and span from large enterprises to the critical infrastructure (CINF) networks. Due to the potential severe damage and cost experienced by a victim nation, CINF networks have been intentionally targeted intentionally and have suffered from significant losses when successfully exploited.

In general, attacks on enterprise networks occur in multiple stages. Consequently, detecting a single intrusion does not necessarily indicate the end of the attack as the attack could have progressed far deeper into the network. Accordingly, individual attack footprints are insignificant in an isolated manner, because each is usually part of a more complex multi-step attack. That is, it takes a sequence of steps to form an attack path toward a target in the network. Researchers have investigated several attack path analysis methods for identifying attacker's required effort (e.g., number of paths to a target and the cost and time required to compromise each path) to diligently estimate risk levels. However, traditional techniques fail to consider important features and provide incomplete solutions for addressing real attack scenarios. For example, some traditional techniques only consider the topological connection between stepping stones to measure the difficulty of reaching a target. As another example, some traditional techniques only assume some predefined attacker skill set to estimate the path complexity. In reality, an attacker's capabilities and knowledge of the enterprise network evolve along attack paths to the target.

In an effort to defend against cyber-attacks, AAGs can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network, and can be used to evaluate fixes of vulnerabilities that the AAG reveals (e.g., by fixing a limited number of issues, any adversary attack on the computer network, or on certain components in the computer network can be stopped). While much research has been dedicated to the analysis of a single AAG, little focus has been given to the analysis and comparison of multiple AAGs. In comparing multiple AAGs, the difference between the AAGs is a target of interest, as differences can reveal vulnerabilities that were added, were removed or that persisted across all AAGs.

In view of the above context, implementations of the present disclosure are directed to leveraging AAGs for process risk determination based on hardness of attack paths represented in the AAGs. As described in further detail herein, an AAG represents components of an enterprise network and paths between components within the enterprise network. One or more components of the enterprise network enable execution of a process of an enterprise (e.g., the enterprise that is operating the enterprise network, or for which the enterprise network is operated). That is, the enterprise performs one or more processes, at least a portion of each process being executed by one or more components of the enterprise network. In some examples, process risk, measured per a respective process risk score, is representative of a degree of risk that a process is susceptible to (e.g., a risk of being disrupted) in view of potential adversarial attacks (e.g., hacking) on the enterprise network.

As described in further detail herein, and in accordance with implementations of the present disclosure, process risk scores are determined based on hardness of attack paths within an AAG. In some examples, a hardness, measured per a hardness value, represents a degree of difficulty an adversary would have in moving along a respective attack path within the enterprise network. In some examples, the higher the hardness value, the more difficult it is for an adversary to move along an attack path, and the less risk there is to the process. Conversely, and in some examples, the lower the hardness value, the less difficult it is for an adversary to move along an attack path, and the more risk there is to the process.

In accordance with implementations of the present disclosure, process risk values can be used to assess remedial measures that can be taken to reduce process risk within the enterprise network. For example, in response to a process risk value that exceeds a threshold value, a remedial measure can be implemented within the enterprise network. The process risk value can be reassessed to determine the effectiveness of the remedial measure and selectively adjust (e.g., replace the remedial measure, adjust parameters of the remedial measure).

As introduced above, implementations of the present disclosure can be realized within, but are not limited to, an agile security platform. In general, the agile security platform provides a cyber-threat analysis solution based on characterizing adversarial behavior in a multi-stage cyber-attack process. As described in further detail herein, how a threat proceeds within a network is investigated using an AAG and all possible attack stages are identified. In some implementations, each stage can be associated with network attributes. Using a holistic view of threat exposure provided by AAGs, attack techniques and tactics are incorporated into stepping stones found in AAGs.

In further detail, the cyber-threat analysis solution adds context to each attack stage using a real-world knowledge base of adversary tactics and techniques to more comprehensively characterize progression along the attack path. In some implementations, an attack path analysis model identifies a level of difficulty in taking a path by considering the complexity of the path, the skill set of the attacker, and the like. Implementations of the present disclosure provide a path hardness that is measured in terms of a capability of the attacker and challenges. The insight into the level of difficulty of an attack path in the network helps security administrators to pinpoint critical paths and prioritize path hardening actions.

As described herein, the agile security platform enables continuous cyber and enterprise-operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In this manner, the agile security platform enables enterprises to increase operational efficiency and availability, maximize existing cyber-security resources, reduce additional cyber-security costs, and grow organizational cyber resilience.

As described in further detail herein, the agile security platform provides for discovery of IT/OT supporting elements within an enterprise, which elements can be referred to as configuration items (CI) or components. Further, the agile security platform can determine how these CIs are connected to provide a CI network topology. In some examples, the CIs are mapped to processes and services of the enterprise, to determine which CIs support which services, and at what stage of a process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the agile security platform is hosted within the server system 108, and monitors and acts on the enterprise network 120, as described herein. More particularly, and as described in further detail herein, one or more AAGs representative of the enterprise network are generated in accordance with implementations of the present disclosure. For example, the agile security platform detects IT/OT assets and generates an asset inventory and network maps, as well as processing network information to discover vulnerabilities in the enterprise network 120. The agile security platform executes process risk determination of the present disclosure based on the network information.

In some examples, the agile security platform provides one or more dashboards, alerts, notifications and the like to cyber-security personnel that enable the cyber-security personnel to react to and remediate security relevant events. For example, the user 112 can include a cyber-security expert that views and responds to dashboards, alerts, and/or notifications of the agile security platform using the client device 102.

In some examples, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform addresses lateral movements across the stack. Through devices, communication channels (e.g., email, TCP/IP), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT/OT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
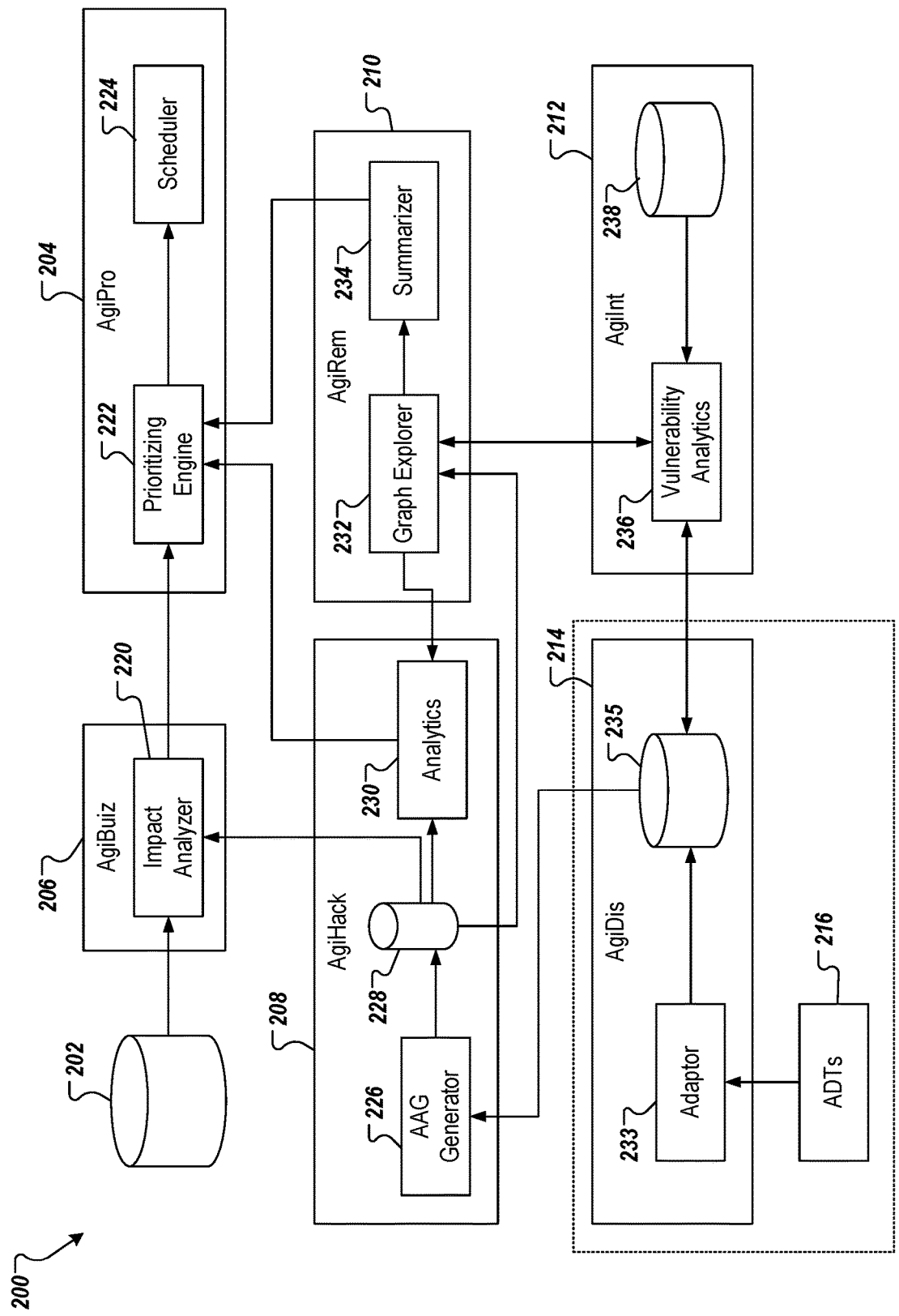
FIG. 2 depicts an example conceptual architecture of an agile security platform.

FIG. 2 depicts an example conceptual architecture 200 of an agile security (AgiSec) platform. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 233, and an asset/vulnerabilities knowledge base 235. In some examples, the adaptor 233 is specific to an asset discovery tool (ADT) 216. Although a single ADT 216 is depicted, multiple ADTs can be provided, each ADT being specific to an IT/OT site within the enterprise network. Because each adaptor 233 is specific to an ADT 216, multiple adaptors 233 are provided in the case of multiple ADTs 216.

In some implementations, the AgiDis service 214 detects IT/OT assets through the adaptor 233 and respective ADT 216. In some implementations, the AgiDis service 214 provides both active and passive scanning capabilities to comply with constraints, and identifies device and service vulnerabilities, improper configurations, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 233 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an analytical attack graph (AAG) generator 226, an AAG database 228, and an analytics module 230. In general, the AgiHack service 208 generates AAGs and evaluates hacking exploitation complexity. For example, the AgiHack service 208 can determine process risk for one or more processes in accordance with implementations of the present disclosure. In some examples, the AgiHack service 208 understands attack options, leveraging the vulnerabilities to determine how a hacker would move inside the network and identify targets for potential exploitation. The AgiHack service 208 proactively explores adversarial options and creates AAGs representing possible attack paths from the adversary's perspective. As described in further detail herein, a hardness of each attack path can be determined (represented as a hardness value) and process risk (represented as a process risk value) can be determined based on hardness values for a respective process.

In further detail, the AgiHack service 208 provides rule-based processing of data provided from the AgiDis service 214 to explore all attack paths an adversary can take from any asset to move laterally towards any target (e.g., running critical operations). In some examples, multiple AAGs are provided, each AAG corresponding to a respective target within the enterprise network. Further, the AgiHack service 208 identifies possible impacts on the targets. In some examples, the AAG generator 226 uses data from the asset/vulnerabilities knowledge base 236 of the AgiDis service 214, and generates an AAG. In some examples, the AAG graphically depicts, for a respective target, all possible impacts that may be caused by a vulnerability or network/system configuration, as well as all attack paths from anywhere in the network to the respective target. In some examples, the analytics module 230 processes an AAG to identify and extract information regarding critical nodes, paths for every source-destination pair (e.g., shortest, hardest, stealthiest), most critical paths, and critical vulnerabilities, among other features of the AAG. If remediations are applied within the enterprise network, the AgiHack service 208 updates the AAG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remediation actions by exploring attack graph and paths. For example, the AgiRem service 210 can execute a cyber-threat analysis solution that characterizes adversarial behavior in a multi-stage cyber-attack process, as described in further detail herein.

In further detail, for a given AAG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remediation actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber-attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AAG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remediation actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remediation actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

As introduced above, cyber-threat analysis for a computer network leverages one or more AAGs. In some examples, an AAG is generated by a cyber-security platform, such as the AgiSec platform described herein. In mathematical terms, an AAG can be described as a directed graph modeled as AAG (V, E) with a set of nodes $V=\{v_1, \ldots, v_n\}$ and a set of edges $E=\{e_1, \ldots, e_m\}$ connecting nodes together, where $|V|=n$ and $|E|=m$.

Figure 3:
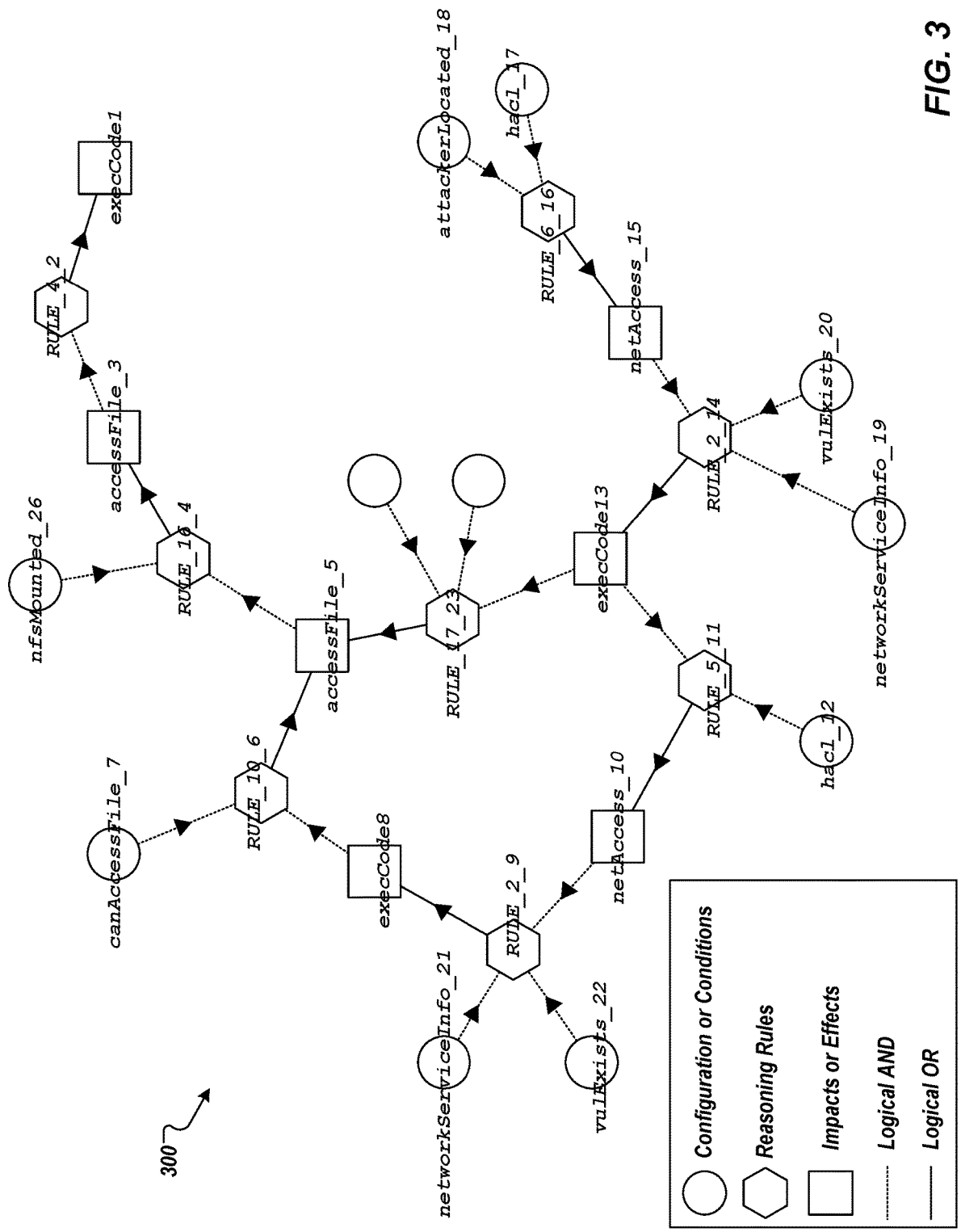
FIG. 3 depicts an example portion of an example analytical attack graph (AAG) to illustrate implementations of the present disclosure.

FIG. 3 depicts an example portion 300 of an example AAG to illustrate implementations of the present disclosure. As depicted in the example of FIG. 3, the AAG can include different node types to show how a set of network and system configurations result in unauthorized actions to specific targets. The example portion 300 is depicted in a database structure (e.g., Neo4j graph database structure). Nodes in an AAG are of different types: circular nodes representing system or network configurations that are the conditions that provide possibilities for actions by an attacker; hexagonal nodes representing reasoning rules that represent the attack methodology leveraged by an attacker to achieve a particular goal; and square nodes that represent an impact as a sub-goal for a certain action an attacker could take. The AAG includes two types of edges: configuration-to-rule edges that represent logical AND (i.e., all configuration conditions have to be true to cause the impact); and rule-to-impact edges that represent logical OR (i.e., the impact happens if at least one rule is satisfied).

In general, the AAG is created by taking into account the configurations directed by some rules in order to make some impacts on the target network. In some examples, all configuration nodes, impact nodes, and rule nodes can be provided in sets $N_p$, $N_d$, $N_r$, respectively. Accordingly, $N_p=\{n_{p,j}|n_{p,j} \in V,\ \forall n_{p,j}\ \text{is a configuration}\}$, $N_d=\{n_{d,j}|n_{d,j} \in V,\ \forall n_{d,j}\ \text{is an impact}\}$, and $N_r=\{n_{r,j}|n_{r,j} \in V,\ \forall n_{r,j}\ \text{is a rule}\}$. Consequently, the combination of these sets accounts for all vertices of the graph. In some examples, a configuration node is referred to herein as an input fact node indicating facts that are provided as input within a configuration. In some examples, impact nodes are referred to herein as derived fact nodes indicating a derived fact that results from applying one or more input facts and/or one or more derived facts to a rule.

AAGs can be used in cyber-threat analysis to determine attack paths of external attackers into and through a computer network. Use of AAGs in mitigating attacks on computer networks is described in further detail in commonly assigned U.S. application Ser. No. 16/554,846, entitled Generating Attack Graphs in Agile Security Platforms, and filed on Aug. 29, 2019, the disclosure of which is expressly incorporated herein by reference in the entirety for all purposes. Further, generation of AAGs is described in further detail in commonly assigned U.S. application Ser. No. 16/924,483, entitled Resource-efficient Generation of Analytical Attack Graphs, and filed on Jul. 9, 2020, the disclosure of which is expressly incorporated herein by reference in the entirety for all purposes.

To provide further context for implementations of the present disclosure, the AAG model presented in MulVAL will be briefly discussed. MulVAL can be described as an automatic end-to-end AAG generation solution. In general, MulVAL takes a specification, such as, but not limited to, MITRE Common Vulnerabilities and Exposures (CVE), describing the configuration of an enterprise network and rules that depict how an attacker can exploit the system configurations to advance in the enterprise network towards a target goal. MulVAL uses datalog as a specification language. In datalog, logical and physical entities of the enterprise network are formally modelled by datalog predicates; n-ary relations between entities are defined by datalog relations; and attack rules are modelled as datalog derivation rules in a datalog program. Derivation rules define preconditions (set of predicates connected by logical 'and') that, if met, derive new predicates. The specification of the predicates and derivation rules can be referred to as the datalog program of the system (enterprise network).

For purposes of illustration, a non-limiting example is introduced in Listing 1, below, which shows a specification of an example datalog program for an enterprise network.

Listing 1: Example datalog program

```
predicates
  .decl domainUser(_user: UserFqdn, _domain: Domain)
  .decl groupContains(_group: GroupFqdn, _principal: Principal)
  .decl isUser(_user: UserFqdn)
  .decl localGroup(_host: Host, _groupName: GroupName, _groupFqdn:
  GroupFqdn)
```

-continued

Listing 1: Example datalog program

```
.decl userInLocalGroup(_host: Host, _groupName: GroupName, _user:
UserFqdn)
.decl isUser(_user: UserFqdn, rule_id: String)
.decl groupContainsDirect(_group: GroupFqdn, _principal:
Principal)
attack rules
groupContains(Group,Principal):-
groupContainsDirect(Group,Principal). # rule label: 28
isUser(User):-domainUser(User,_). # rule label: 80
userInLocalGroup(Host,GroupName,User):-
localGroup(Host,GroupName,GroupFqdn),groupContains(GroupFqdn,User
,_),isUser(User,_). # rule label: 25
```

The example datalog program of Listing 1 lists seven predicates. Each predicate is a function that maps objects of different types to a Boolean value. For example, the predicate domainUser maps objects of type User and objects of type Domain to True if the user belongs to the domain, and False otherwise.

The example datalog program of Listing 1 lists three attack rules. The first attack rule indicates that a predicate groupcontains is derived from the predicate groupContainsDirect (with the corresponding objects). The third attack rule indicates that three precondition predicates: isUser, localGroup, groupContains derive the predicate userInLocalGroup (with the corresponding objects). Each rule has a unique identifier (id). For example, 28 for the first attack rule and 25 for the third attack rule.

The system configuration (e.g., instance of hosts, users, privileges on host, etc.) is provided as an array of facts (also referred to as grounds), each fact associated with a predicate of the datalog program.

Table 1: Example Input Facts for domainuser Table 1, below, lists four input facts of the isDomain predicate.

TABLE 1

Example Input Facts for domainUser

| | |
|---|---|
| <ADMINISTRATOR>@CYBER.LOCAL | CYBER.LOCAL |
| BERTHA.DAVIES@CYBER.LOCAL | CYBER.LOCAL |
| BRANDON.DAVIS@CYBER.LOCAL | CYBER.LOCAL |
| DANIELLE.HINTON@CYBER.LOCAL | CYBER.LOCAL |

The listed user-domain pairs represent mappings that are True. Combinations (of user and domain) that are not listed in the input facts are considered False, until proven otherwise (i.e., derived by a rule).

MulVAL uses a datalog solver on the program specification to check whether there exists an attack path from the input facts to a target goal. It does this by iteratively applying the derivation rules on facts until either reaching a target goal (a path exists) or reaching a fixed point, from which no new fact can be derived. In this case, no attack path to the target exists and the system is considered to be secure.

The derivation process from the grounded facts to the target goals is represented in the resulting AAG. As described herein, an AAG is provided as a data object that records nodes and edges between nodes. The data object underlying an AAG can be processed to generate a visual representation, a graph, of the AAG.

In further detail, MulVAL generates an AAG that shows the derivation of grounded facts by the application of rules. Formally, the AAG is defined as: AAG=($N_r$, $N_p$, $N_d$, E, L, Args, G), where $N_r$, $N_p$, $N_d$ are the sets of nodes (rules (r), input facts (p), and derived facts (d), respectively), E is a set of edges that connect from facts to derivation rules (precondition) and from derivation rules to derived facts, L is a mapping from a node (i.e., an input fact, a derived fact, a rule) to its label (i.e., the predicate or rule that it is associated with), Args is a mapping of facts to their arguments (i.e., objects they are associated with), and G∈$N_d$ describes the target goal (e.g., crown jewel that may be a target for hackers). N denotes the union of all node elements in the graph (i.e., N=$N_r$∪$N_p$∪$N_a$). In some examples, primitive nodes and derived nodes (i.e., fact nodes) are denoted by $N_f$, where $N_f$=$N_p$∪$N_d$. Every fact node in the graph is labeled with a logical statement in the form of a predicate applied to its arguments. In some examples, Args and L are separately encoded. For example, a configuration c={"DomainUser", "BERTHA.DAVIES@CYBER.LOCAL", "CYBER.LOCAL"} can be encoded as $N_p$={node_1}; L(node_1)="DomainUser"; Args(node_1)= ["BERTHA.DAVIES@CYBER.LOCAL", "CYBER.LOCAL"].

Every element of the AAG is uniquely identifiable. Each fact (input fact, derived fact) node is uniquely defined by its arguments and predicate label (i.e., no two nodes may have the same label and arguments). For example, a unique identifier (index) for each fact node can be provided based on this information. Every rule node is uniquely defined by its label, preconditions and derived fact. As also described in further detail herein, a unique index for each rule node can be provided based on this information. The AAG size can be defined as the number of nodes and edges in the AAG.

As introduced above, implementations of the present disclosure are directed to leveraging an AAG for process risk determination based on hardness of attack paths represented in an AAG. In some examples, process risk, measured per a respective process risk score, is representative of a degree of risk that a process is susceptible to (e.g., a risk of being disrupted) in view of potential adversarial attacks (e.g., hacking) on the enterprise network. In some implementations, process risk scores are determined based on hardness of attack paths within an AAG. In some examples, a hardness, measured per a hardness value, represents a degree of difficulty an adversary would have in moving along a respective attack path within the enterprise network.

Figure 4A:
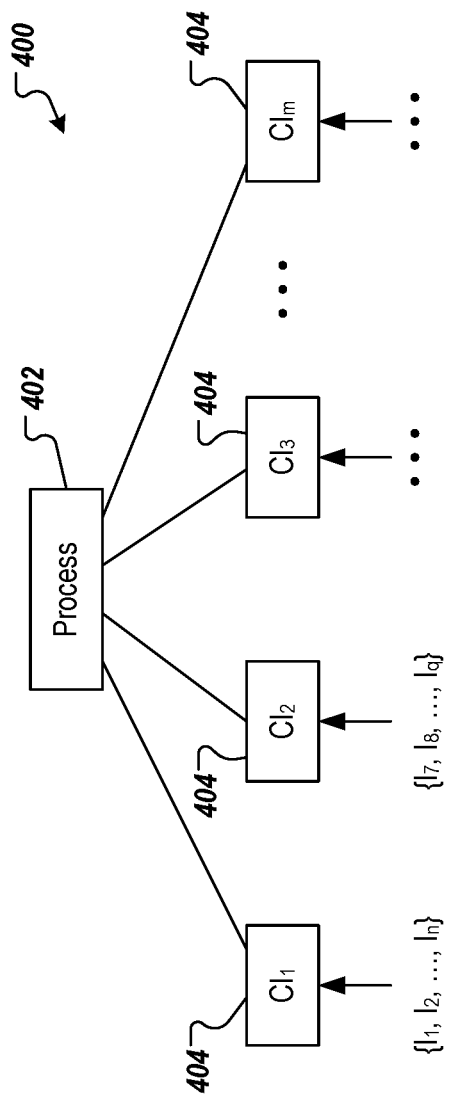
FIGS. 4A and 4B conceptually depict process risk determination in accordance with implementations of the present disclosure.
Figure 4B:
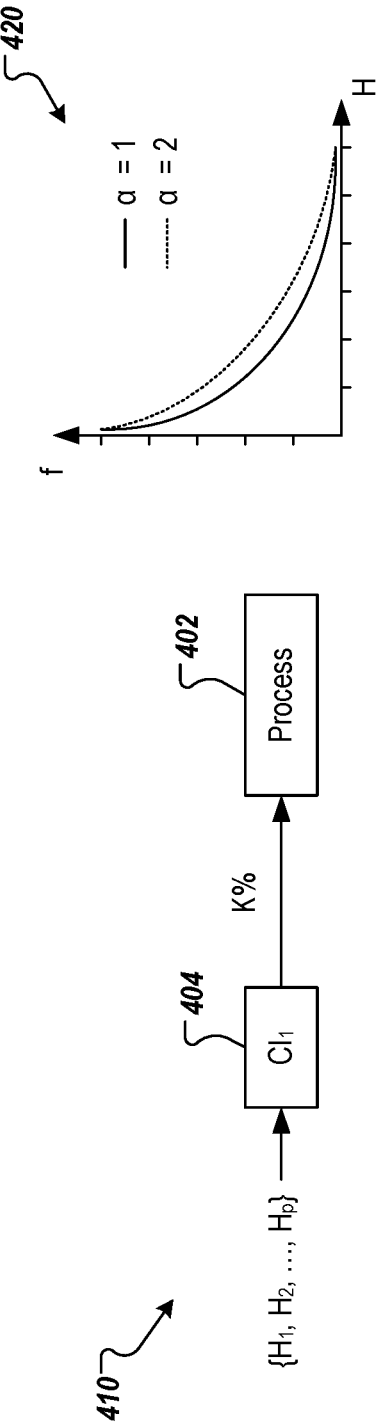

FIGS. 4A and 4B conceptually depict a portion of process risk determination in accordance with implementations of the present disclosure. With particular reference to FIG. 4A, a process 402 is represented and includes a process of an enterprise that is at least partially executed within an enterprise network. In the example of FIG. 4A, the process 402 is at least partially executed by a set of CIs 404 (e.g., $CI_1$, ..., $CI_m$). As described herein, each CI can be susceptible to one or more impacts (I). In the example of FIG. 4A, $CI_1$ is susceptible to impacts $I_1, \ldots, I_n$, $CI_2$ is susceptible to impacts $I_7, \ldots, I_q$, and so on. Example impacts can include, but are not limited to, file access, network access, code execution, denial of service (DoS), and distributed DoS (DDoS). As described herein, whether an impact is achievable on a CI is determined by applying facts (e.g., conditions, configurations) to rules.

In some examples, each CI can pose a respective risk to a process. That is, if the particular CI is compromised, the risk that such a situation may have on the process (e.g., disruption of the process, halting the process, manipulation of the process). For example, a first CI can pose little to no risk on a process, while a second CI can pose significant risk to the process. In some examples, each CI and impact combination (i.e., CI-I pair, $[CI_i, I_j]$) can pose a respective risk to a process. For example, a first impact on a CI can pose little to no risk on a process, while a second impact on the CI can pose a significant risk to the process.

In accordance with implementations of the present disclosure, process risk posed by a respective CI-I pair is determined based on hardness of one or more attack paths leading to the particular impact. This is referred to as path hardness herein, which is provided as a path hardness value that represents a relative degree of hardness (difficulty) to travel along an attack path. In some implementations, and as described in further detail herein, path hardness can be determined based on a single-path formula or a multi-path formula.

In further detail, the summation formula is used for determining a path hardness based on a single path to a CI for a respective I. The multi-path formula is used for path hardness based on multiple paths to a CI for a respective I. In some implementations, a process risk value ($RK_{Proc}$) is determined based on the path hardness, where the path hardness is used to calculate a factor (f). The following example relationship can be provided:

$$f = e^{-\frac{H_{CI-I}}{\alpha}}$$

where $H_{CI}$ is a path hardness value for the CI-I pair and $\alpha$ (alpha) is a shape parameter. In some examples, $\alpha$ is greater than or equal to zero (e.g., $\alpha \geq 0$). In some examples, $\alpha$ is selected to provide a desired curve in a relationship between f and H. For example, FIG. 4B depicts an example graph 420 depicting f to H curves for respective values of oc.

In some examples, hardness values H for CI-I pairs are provided from one or more database systems. Here, the hardness value indicates a hardness (difficulty) in achieving the particular I in the particular CI. In this sense, the hardness value indicates a hardness (difficulty) in executing a respective rule R to achieve the particular i in the particular CI.

In some examples, the hardness values can be known values stored one or more database systems and can be retrieved based on respective CI-I pairs. In some examples, a query can be used to query a database system, the query identifying a CI-I pair, and the database system returns a query response that includes the hardness value for the CI-I pair. An example database system can include, without limitation, the MITRE ATT&CK® knowledge base (provided by The MITRE Corporation), which is described as a globally accessible knowledge base of adversary tactics and techniques based on real-world observations.

In some implementations, $RK_{Proc}$ is determined based on the following example relationship:

$$RK_{Proc} = f \times C$$

where C is a contribution of the CI in the CI-I pair to the process. In some examples C is provided as a percentage, which represents a degree to which the CI contributes to the process. In some examples, the enterprise maintains a database that stores a contribution C for a respective CI to a respective process (e.g., a tuple [CI, P, C] for each CI and process P pair). For example, for a Process A, $C_1$=10% for $CI_1$ and $C_2$=90% for $CI_2$. In some examples, the contributions of each CI are provided based on expertise of agents of the enterprise (e.g., IT professionals) and/or from observations of previous process failures.

In accordance with implementations of the present disclosure, and as introduced above, path hardness can be determined based on a single-path formula or a multi-path formula. For example, the single-path formula is used for path hardness, if there is a single path to a CI, and the multi-path formula is used for path hardness, if there are multiple paths to a CI. An example relationship for the single-path formula is provided as:

$$H_{path,I_i} = \Sigma(H_{I_{i-1}}, H_{I_{i-2}}, \ldots)$$

where i is a counter indicating the impact that is being considered (i.e., the impact of the CI-I pair). An example relationship for the multi-path formula is provided as:

$$H_{path,I_i} = -\alpha \ln\left(1 - \left(1 - e^{-\frac{H_{P_1}}{\alpha}}\right)\left(1 - e^{-\frac{H_{P_2}}{\alpha}}\right)\ldots\right)$$

where $H_{P1}$ and $H_{P2}$ are hardness values for respective paths (P1, P2) leading to the impact i.

In some implementations, a factor (f) is determined for each CI-I pair based on the respective path hardness value ($H_{path,I_i}$) In this manner, a set of factors is provided for a CI, each factor being specific to an impact that is achievable within the CI. In some examples, each factor in the set of factors is used to determine a portion of process risk that a respective impact has on the process.

Figure 5:
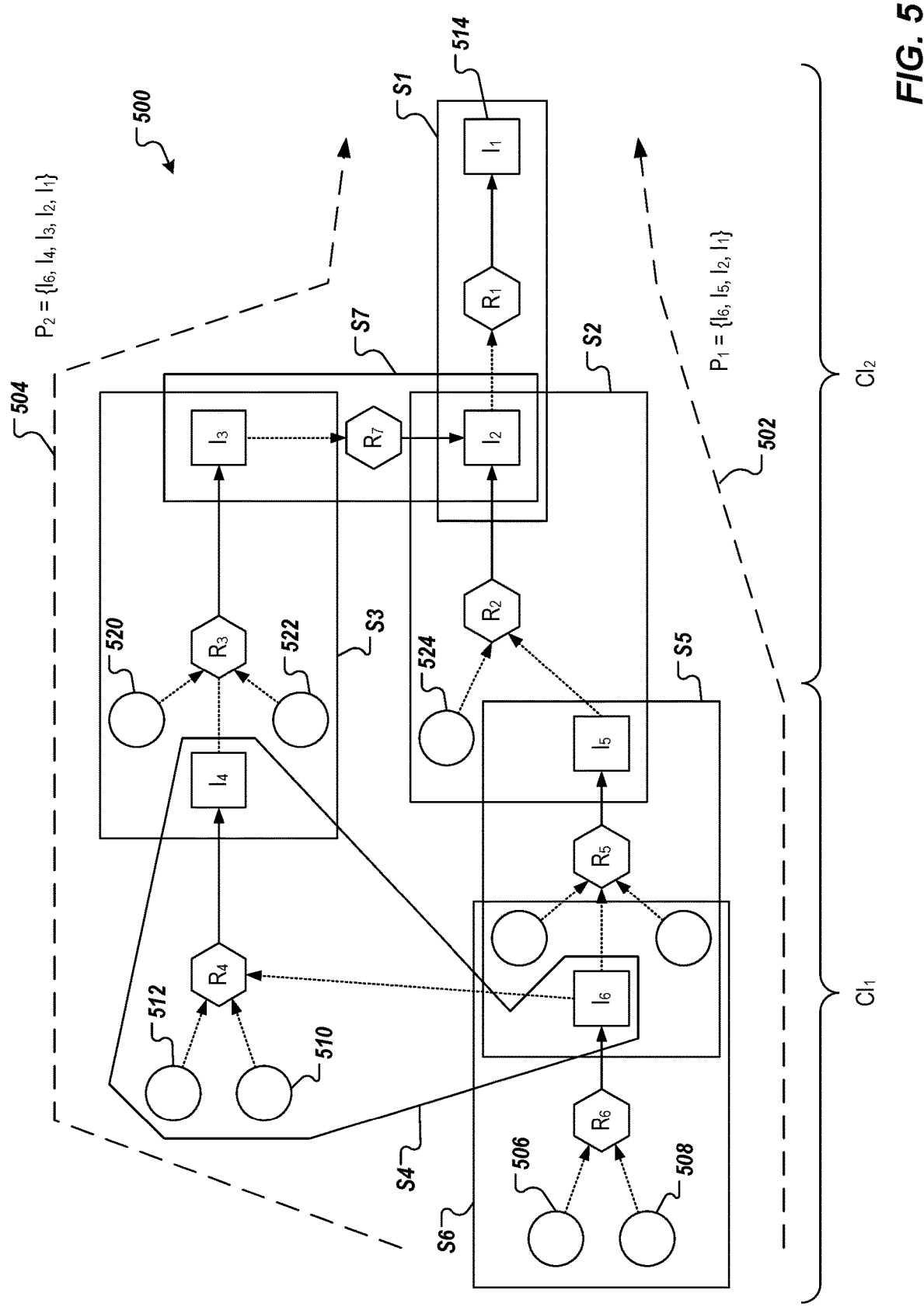
FIG. 5 depicts an example portion of an example AAG including multiple attack paths.

Implementations of the present disclosure are described in further detail herein with reference to a non-limiting example depicted in FIG. 5. More particularly, FIG. 5 depicts an example portion 500 of an example AAG including multiple attack paths, namely an attack path 502 and an attack path 504. In the example of FIG. 5, the example portion 500 is spread across a first configuration item ($CI_1$) and a second configuration item ($CI_2$), and each attack path 502, 504, starts from fact nodes (input conditions) 506, 508 to a derived fact node represented as an impact ($I_1$) 514. Each attack path 502, 504 respectively progresses from the fact nodes 506, 508 through derived fact nodes (impacts) based on rules to the impact ($I_1$) 514. However, the attack path 504 is also dependent on fact nodes 510, 512.

In the example of FIG. 5, the attack path 502 (first attack path) is represented as $P_1=\{I_6, I_5, I_2, I_1\}$, and the attack path 504 (second attack path) is represented as $P_2=\{I_6, I_4, I_3, I_2, I_1\}$. Progression along the attack paths 502, 504 can be abstracted as progressions between steps (S). In the example of FIG. 5, depicted steps include $S=\{S_1, S_2, S_3, S_4, S_5, S_6, S_7\}$. In some examples, the steps correspond to movement within a physical attach graph (PAG) of the underlying enterprise network.

In the example of FIG. 5, a process risk for a particular process is to be determined, where the second configuration item ($CI_2$) is wholly attributed with execution of the process. That is, the first configuration item ($CI_1$) does not execute any portion of the process, for which a process risk is to be determined. However, the first configuration item ($CI_1$) is along attack paths to the second configuration item ($CI_2$). Consequently, and in this non-limiting example, example CI-I pairs can be provided as: $CI_2$-$I_1$, $CI_2$-$I_2$, and $CI_2$-$I_3$, each of $I_1$, $I_2$, and $I_3$ being achievable in $CI_2$.

In the example of FIG. 5, a single path is provided to $I_1$, which includes evaluating rule $R_1$ with $I_2$, a single path is provided to $I_3$, which includes evaluating $R_3$ with $I_4$ and other facts represented by fact nodes 520, 522, and multiple paths are provided to $I_2$, which includes evaluating $R_7$ with $I_3$, or evaluating $R_2$ with $I_5$ and another fact represented by a fact node 524. In some implementations, a hardness value for each impact is determined (e.g., from one or more database systems, as described herein).

In the example of FIG. 5, dependencies between impacts $I_1$, $I_2$, and $I_3$ within $CI_2$ can be provided as:

$I_1$ depends on $I_2$ and $I_3$
$I_2$ depends on $I_3$
$I_3$ is not dependent on either $I_1$ or $I_2$ Because there is a single path to $I_3$, the single-path formula is used to determine path hardness for [$CI_2$, $I_3$]. For example:

$$H_{path,I_3} = \Sigma(H_{I_6}, H_{I_4}, H_{I_3})$$

This can also be written as:

$$H_{path,I_3} = \Sigma(H_{R_6}, H_{R_4}, H_{R_3})$$

where $H_R$ indicates a hardness of executing the respective rule to achieve the respective impact (e.g., $H_I = H_R$).

Because there are multiple paths to $I_2$, the multi-path formula is used to determine path hardness for [$CI_2$, $I_2$]. For example:

$$H_{path,I_2} = -\alpha \ln\left(1 - \left(1 - e^{\frac{-H_{P_1,I_2}}{\alpha}}\right)\left(1 - e^{\frac{-H_{P_2,I_2}}{\alpha}}\right)\right)$$

where $H_{path_1,I_2}$ is a path hardness for the first path to $I_2$ (e.g., through $R_2$) and $H_{path_2,I_2}$ is a path hardness for the second path to $I_2$ (e.g., through $R_7$).

Because there is a single path to $I_1$ within $CI_2$, the single-path formula is used to determine path hardness for [$CI_2$, $I_1$]. For example:

$$H_{path,I_1} = \Sigma(H_{I_2}, H_{I_1})$$

This can also be written as:

$$H_{path,I_2} = \Sigma(H_{R_6}, H_{R_7})$$

In some implementations, using the respective path hardness values, a set of factors can be determined for $CI_2$. For example:

$$f_{CI_2-I_1} = e^{-\frac{H_{path,I_1}}{\alpha}}$$

$$f_{CI_2-I_2} = e^{-\frac{H_{path,I_2}}{\alpha}}$$

$$f_{CI_2-I_3} = e^{-\frac{H_{path,I_3}}{\alpha}}$$

As introduced above, each impact can have a different effect and represent a different level of risk than other impacts. In view of this, a process risk value ($RK_{Proc}$) is determined for each impact using the respective factor determined for the impact. Continuing with the example of FIG. 5, this can be represented as:

$$RK_{Proc,CI_2-I_1} = f_{CI_2-I_1} \times C_{CI_2}$$

$$RK_{Proc,CI_2-I_2} = f_{CI_2-I_2} \times C_{CI_2}$$

$$RK_{Proc,CI_2-I_3} = f_{CI_2-I_3} \times C_{CI_2}$$

where $C_{CI_2}$ is the contribution of $CI_2$ to the process in question (e.g., in this example, $C_{CI_2}$=100%).

In accordance with implementations of the present disclosure, a contribution of a CI in terms of process risk (i.e., risk to an entire process) can be unknown and/or difficult to calculate. For example, the contribution can depend on a type of attack implemented on the CI. Here, the contribution to process risk is referenced as a risk contribution K (e.g., provided as a percentage). In further detail, and by way of non-limiting example, a case can be considered, in which three CIs control a process. However, the CIs cannot be assumed to expose risk to the process of 33.3% each. In this example, if $CI_1$ fails, the entire process fails (so the risk contribution of $CI_1$ is 100%), but if $CI_2$ or $CI_3$ fail, only 10% of the process is affected. Interestingly, the sum of the contributions (e.g., $K_1+K_2+K_3$) is larger than 100%.

In view of this, implementations of the present disclosure provide the model depicted in FIG. 4A. For example, when considering a case, in which $CI_1$ fails, the impact of that event need be determined. If, for example, $CI_1$ is a programmable logic controller (PLC) and the impact is DoS, then it may only cause delay in the communication and periodically lose some packets, but not 100% of the packets. Consequently, this only partially affects the process (i.e., partial risk to the process, where K<100%). If, however, the attack is a change in a set value to cause physical damage to the PLC, then there would be 100% risk contribution to the failure of the entire process (i.e., K=100%).

In view of this, and as described in detail herein, implementations of the present disclosure provide that, for each impact of each CI, expert knowledge on how much the impact on the CI affects the process (contribution to the risk) is stored (e.g., see discussion above regarding tuples [CI, P, C]), and is leveraged to determine the overall process risk. That is, and as described in detail herein, implementations of the present disclosure consider the hardness of making that impact (hardness of the path to that impact) in calculating the factor (f) and multiply the factor (f) by the respective contribution percentage of the impact to show how much risk the impact causes to the entire process.

In response to vulnerabilities detected within an enterprise network, one or more security controls (also referred to herein as remediations) can be implemented to mitigate process risk presented by a vulnerability. However, implementing security controls requires expenditure of time and technical resources (e.g., processors, memory, bandwidth). Implementing ineffective security controls not only results in failing to mitigate the vulnerability, leaving the enterprise network susceptible to risk, it also results in wasted and/or inefficient use of technical resources.

In accordance with implementations of the present disclosure, the process risk value can be used to identify vulnerabilities in terms of CIs and/or CI-I pairs that pose an unacceptable level of risk to a process. For example, if the process risk value for a CI-I pair exceeds a threshold process risk value, it can be determined that the CI-I pair poses an unacceptable level of risk to the process. In response, one or more security controls can be implemented in an effort to mitigate or remove the process risk. Example remediations can include, without limitation, a remediation that increases the difficulty (hardness) in achieving the impact, and a remediation that entirely removes the impact from being achieved.

Example security controls include, without limitation, those provided in the ISO/IEC 27001. To illustrate this principle with an example, MITRE ATT&K tactic T11751 can be considered, which defines a lateral movement of a hacker from one machine to another by utilizing MS Windows Distributed COM (DCOM) infrastructure. To use this tactic, an adversary must acquire a user account with certain privileges. Such an account should be from a member of the DCOM group on a host machine.

Consequently, the hacker can perform a Remote Procedure Call (RPC) over the network to a target machine. In addition, the target machine must be listening on a predefined set of ports supported by DCOM infrastructure. To mitigate the exposure to this type of attack, MITRE offers several tactics that we map to ISO/IEC 27001 standard. Namely, MITRE T1175 requirements are to implement three mitigations, in which a security expert may need to implement several security controls. In the case of T1175, the security expert may opt to implement an Access Control Policy (A911), an Access to Networks and Network Services Policy (A912), and a Segregation in Networks Policy (A1313). By implementing even one of these three security controls, a defender can eliminate these potential lateral movements. Accordingly, the conditional logic is an AND relation between the policies.

In accordance with implementations of the present disclosure, a set of AAGs can be provided for an enterprise network, each AAG being generated at a respective time. In some examples, AAGs can be generated at a pre-defined period of time (e.g., hourly, daily, weekly) to provide the set of AAGs. In some examples, a set of process risk values are calculated for processes executed by CIs represented in each AAG. Process risk values in the set of process risk values can be monitored over time to determine a need for and/or an effectiveness of one or more security controls in mitigating respective process risk values. For example, in response to a process risk value exceeding a threshold process risk value as determined based on a first AAG generated at a first time, one or more security controls can be implemented (e.g., in an effort to remediate vulnerabilities in one or more CIs that contribute to execution of the process). A second AAG can be generated at a second time (after the first time) and a process risk value for the process can again be determined. An effectiveness of the one or more security controls can be evaluated by, for example, determining whether the process risk value from the second AAG is less than the process risk value from the first AAG, or whether the process risk value from the second AAG is less than the process risk value threshold. In some examples, if the effectiveness does not meet an expected effectiveness (e.g., the process risk value from the second AAG is not less than the process risk value from the first AAG and/or is not less than the process risk value threshold), one or more additional security controls can be implemented. In some examples, if the effectiveness does not meet an expected effectiveness (e.g., the process risk value from the second AAG is not less than the process risk value from the first AAG and/or is not less than the process risk value threshold), the one or more security controls that had been originally implemented can be halted and/or reversed.

Figure 6:
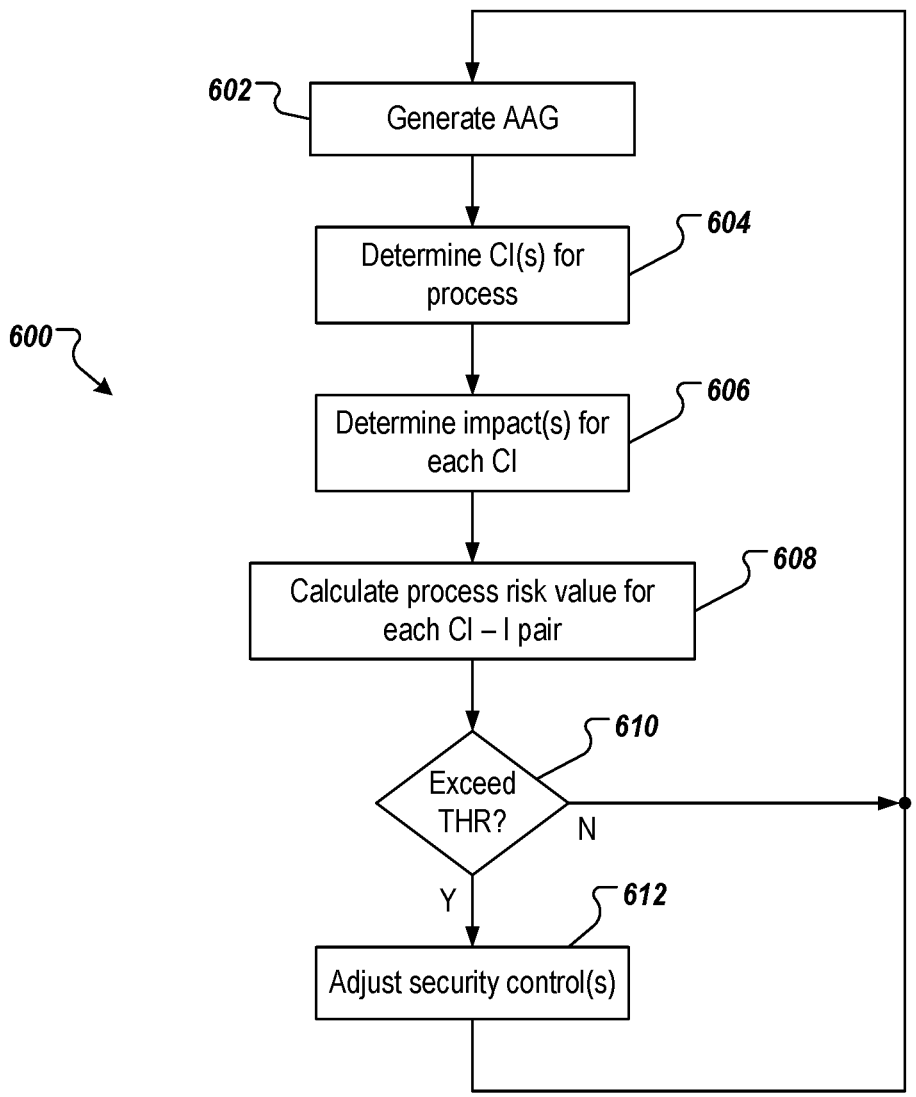
FIG. 6 depicts an example process that can be executed in accordance with implementations of the present disclosure.

FIG. 6 depicts an example process 600 that can be executed in accordance with implementations of the present disclosure. In some implementations, the example process 600 may be performed using one or more computer-executable programs executed using one or more computing devices.

An AAG is generated (602). For example, and as described herein, an AAG can be generated that is representative of at least a portion of an enterprise network. In some examples, the AAG can be generated using MulVAL, as described herein. Example portions of example AAGs are described herein with reference to FIGS. 3 and 4. One or more CIs for a process are identified (604). For example, for a particular process a set of CIs that contribute to execution of at least a portion of the process is provided. In some examples, an enterprise (that operates the enterprise network, or for which the enterprise network is operate) provides the set of CIs for the process (e.g., provides a list of CIs).

One or more Is for each CI are determined (606). For example, a set of Is for each CI can be determined from the AAG. In the example of FIG. 5, $I_1$, $I_2$, and $I_3$ are determined for $CI_2$. A process risk value is determined for each CI-I pair (608). For example, and as described herein, for any I that is reached by a single path in the AAG, the single-path formula is used to determine a path hardness that is used to calculate the process risk value, and, for any I that is reached by multiple paths in the AAG, the multi-path formula is used to determine a path hardness that is used to calculate the process risk value.

It is determined whether any process risk value exceeds a threshold process risk value (610). If no process risk value exceeds the threshold process risk value, the example process 600 loops back. If one or more process risk values exceed the threshold process risk value, one or more security controls are adjusted (612), and the example process 600 loops back. In some examples, adjusting one or more security controls can include implementing one or more security controls in an effort to mitigate process risk. In some examples, adjusting one or more security controls can include halting and/or reversing at least one security control that had been previously implemented in an effort to mitigate process risk.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for security of enterprise networks, the method being executed by one or more processors and comprising:
receiving analytical attack graph (AAG) data representative of one or more AAGs, each AAG representing one or more lateral paths between configuration items within an enterprise network;
calculating, for each configuration item in a set of configuration items, a process risk value for each impact in a set of impacts achievable within the configuration item, for a first impact, a first process risk value being calculated based on a multi-path formula in response to determining that multiple paths in the AAG lead to the first impact, wherein the multi-path formula is:

$$H_{path,I_i} = -\propto \ln\left(1 - \left(1 - e^{-\frac{H_{P_1}}{\propto}}\right)\left(1 - e^{-\frac{H_{P_2}}{\propto}}\right)...\right)$$

where $H_{path,I_i}$ is a path hardness value representing a difficulty to reach impact $I_i$, and $H_{P1}$ and $H_{P2}$ are hardness values for respective paths (P1, P2) leading to impact $I_i$, and, for a second impact, a second process risk value being calculated based on a single-path formula in response to determining that a single path in the AAG leads to the second impact; and
  determining that at least one process risk value exceeds a threshold process risk value, and in response, adjusting one or more security controls within the enterprise network.

2. The method of claim 1, wherein adjusting one or more security controls within the enterprise network comprises implementing at least one security control.

3. The method of claim 1, wherein adjusting one or more security controls within the enterprise network comprises one or more of rolling back at least one security control of the one or more security controls and implementing at least one additional security control.

4. The method of claim 1, wherein the one or more security controls are determined to be ineffective in response to the process risk value one of remaining static and increasing after implementing the one or more security controls.

5. The method of claim 1, wherein the one or more security controls comprise one or more security controls provided in ISO/IEC 27001.

6. One or more non-transitory computer-readable storage media coupled to one or more processors and having instructions stored thereon which, when executed by the one or more processors, cause the one or more processors to perform operations for security of enterprise networks, the operations comprising:
  receiving analytical attack graph (AAG) data representative of one or more AAGs, each AAG representing one or more lateral paths between configuration items within an enterprise network;
  calculating, for each configuration item in a set of configuration items, a process risk value for each impact in a set of impacts achievable within the configuration item, for a first impact, a first process risk value being calculated based on a multi-path formula in response to determining that multiple paths in the AAG lead to the first impact, wherein the multi-path formula is:

$$H_{path,I_i} = -\propto \ln\left(1 - \left(1 - e^{-\frac{H_{P_1}}{\propto}}\right)\left(1 - e^{-\frac{H_{P_2}}{\propto}}\right)...\right)$$

where $H_{path,I_i}$ is a path hardness value representing a difficulty to reach impact $I_i$, and $H_{P1}$ and $H_{P2}$ are hardness values for respective paths (P1, P2) leading to impact $I_i$, and, for a second impact, a second process risk value being calculated based on a single-path formula in response to determining that a single path in the AAG leads to the second impact; and
  determining that at least one process risk value exceeds a threshold process risk value, and in response, adjusting one or more security controls within the enterprise network.

7. The non-transitory computer-readable storage media of claim 6, wherein adjusting one or more security controls within the enterprise network comprises implementing at least one security control.

8. The non-transitory computer-readable storage media of claim 6, wherein adjusting one or more security controls within the enterprise network comprises one or more of rolling back at least one security control of the one or more security controls and implementing at least one additional security control.

9. The non-transitory computer-readable storage media of claim 6, wherein the one or more security controls are determined to be ineffective in response to the process risk value one of remaining static and increasing after implementing the one or more security controls.

10. The non-transitory computer-readable storage media of claim 6, wherein the one or more security controls comprise one or more security controls provided in ISO/IEC 27001.

11. A system, comprising:
  one or more processors; and
  a computer-readable storage device coupled to the one or more processors and having instructions stored thereon which, when executed by the one or more processors, cause the one or more processors to perform operations for security of enterprise networks, the operations comprising:
    receiving analytical attack graph (AAG) data representative of one or more AAGs, each AAG representing one or more lateral paths between configuration items within an enterprise network;
    calculating, for each configuration item in a set of configuration items, a process risk value for each impact in a set of impacts achievable within the configuration item, for a first impact, a first process risk value being calculated based on a multi-path formula in response to determining that multiple paths in the AAG lead to the first impact, wherein the multi-path formula is:

$$H_{path,I_i} = -\propto \ln\left(1 - \left(1 - e^{-\frac{H_{P_1}}{\propto}}\right)\left(1 - e^{-\frac{H_{P_2}}{\propto}}\right)...\right)$$

where $H_{path,I_i}$ is a path hardness value representing a difficulty to reach impact $I_i$, and $H_{P1}$ and $H_{P2}$ are hardness values for respective paths (P1, P2) leading to impact $I_i$, and, for a second impact, a second process risk value being calculated based on a single-path formula in response to determining that a single path in the AAG leads to the second impact; and
    determining that at least one process risk value exceeds a threshold process risk value, and in response, adjusting one or more security controls within the enterprise network.

12. The system of claim 11, wherein adjusting one or more security controls within the enterprise network comprises implementing at least one security control.

13. The system of claim 11, wherein adjusting one or more security controls within the enterprise network comprises one or more of rolling back at least one security control of the one or more security controls and implementing at least one additional security control.

14. The system of claim 11, wherein the one or more security controls are determined to be ineffective in response to the process risk value one of remaining static and increasing after implementing the one or more security controls.

* * * * *